(12) United States Patent
Chang

(10) Patent No.: US 6,327,637 B1
(45) Date of Patent: Dec. 4, 2001

(54) INTERFACE TAP FOR 1394-ENABLED SERIAL BUS DEVICE

(75) Inventor: Ben Chang, Cupertino, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/216,033

(22) Filed: Dec. 18, 1998

(51) Int. Cl.$^7$ .................................................. G06F 13/00
(52) U.S. Cl. ............................................................ 710/129
(58) Field of Search ................................... 710/100, 101, 710/126, 129

(56) References Cited

U.S. PATENT DOCUMENTS 5,394,556   2/1995  Oprescu.
6,157,972 * 12/2000 Newman et al. ..................... 710/100

OTHER PUBLICATIONS

IEEE Standard for a High Performance Serial Bus IEEE Std. 1394–1995 Aug. 30, 1996.

* cited by examiner

*Primary Examiner*—Glenn A. Auve
(74) *Attorney, Agent, or Firm*—Dan A. Shifrin

(57) ABSTRACT

Logic for a 1394-enabled system is disclosed which enables multiple internal link layers, connected to corresponding 1394 devices, to communicate with each other without an intervening physical layer, thereby eliminating one or more PHY chips and associated PHY-PHY cables and connectors (reducing both cost and power consumption). Using a single, optional PHY chip or the integrated PHY block, the internal devices can also communicate with external 1394 devices. The logic can also include, among other elements: multi-node logic to permit data to be transmitted between a device on an external 1394 bus and a selected one of two or more internal link layers; packet overlap logic to permit data to be transmitted between two internal link layers while data is being transmitted on an external 1394 bus; and a PHY-emulation module to provide each internal link layer with a corresponding "virtual" PHY layer having a node ID which is unique on an external 1394 bus.

31 Claims, 7 Drawing Sheets

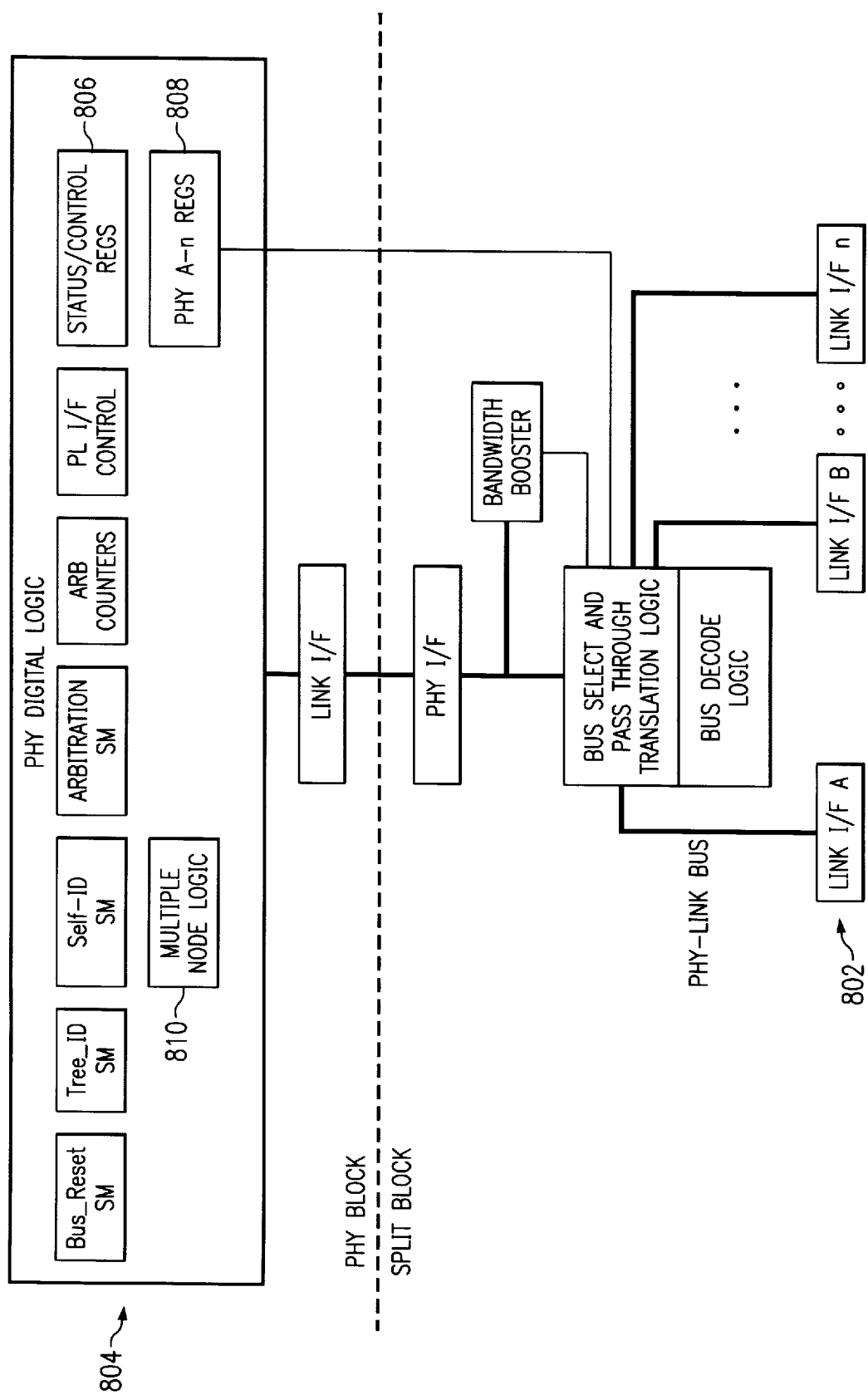

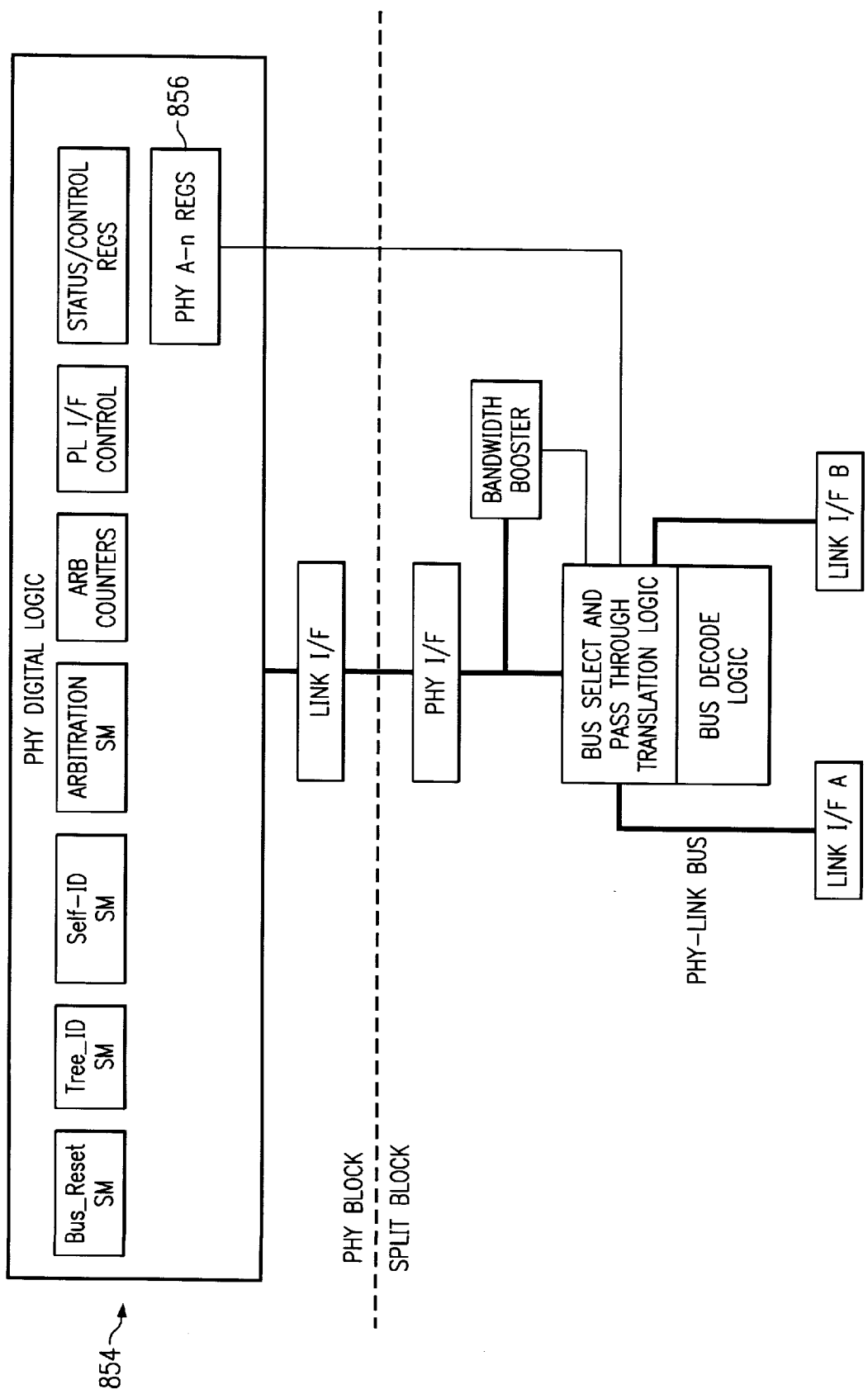

INTERFACE TAP FOR 1394-ENABLED SERIAL BUS DEVICE

FIELD OF THE INVENTION

The present invention relates generally to the 1394 high speed serial bus and, more specifically to sharing one physical layer among two or more link layers.

BACKGROUND OF THE INVENTION

The IEEE 1394–1995 standard (also popularly known as "Firewire" ®) describes a high speed, low cost serial bus to which compatible devices can be connected (even hot plugged) and automatically recognized. Although a detailed description of the 1394 standard will not be provided herein, an overview of certain aspects of bus and node architecture will be presented to aid in understanding the present invention.

1394 Bus Overview

FIG. 1 illustrates the basic physical topology of the bus. A 1394-compatible device 100, such as a computer, may include a serial bus backplane 102 to which internal devices, such as CPU 104, memory 106 and input/output interface 108 are connected. The backplane 102 is connected to a serial bus cable 110 through a bridge 112. The cable 110 is connected to ports on an additional, stand-alone 1394-compatible device 140, such as a hard disk drive, which in turn is daisy-chained to other devices 142, 144, 146, 148, 150, and 152. It will be understood that, one of the advantages of the 1394 environment is that any compatible device can be connected to a port on any other compatible device and in any order, with multi-port interfaces (such as that on the stand-alone CPU 142) repeating signals received in one port through to each other port: data can be transmitted from any device on the bus to any other device. Consequently, the specific configuration shown in FIG. 1 is for illustrative purposes only.

Each device connected to the 1394 bus is a uniquely identifiable node with an assigned logical address. When a node is connected to the bus, the bus is automatically re-initialized, clearing topology information stored in each node. Thereafter, one node is designated as the "root" node and the other nodes designated as "branches" or "leaves", thereby describing a "tree". Two nodes which are directly connected to each other are also described in parent/child terms, with the parent being closer to the root. Next, each node selects a unique ID and sends the identity information to all other connected nodes which store a table of the node IDs and their respective characteristics (including, for example, the maximum transmission/reception speed of each node). With such information, each node is able to target a particular node to a receive data packet.

When a data packet is to be sent from one node to another, the sending node begins to arbitrate on the bus by sending a request to its parent which forwards the request to its parent (if it is not the root) while denying bus access to later-received requests from any other of its children. The request is forwarded up the tree, child to parent, until it arrives at the root node which denies bus access to later-received requests from any of its other children. The root then grants access to the node which won the arbitration and all denied requests are withdrawn. The sending node alerts all other nodes that data is about to be sent and the data packet is transmitted onto the bus, addressed to the target node. Each node receives the packet and repeats it through its other ports and the packet eventually reaches the target node. The arbitration method just described, while ensuring that only one node at a time can transmit data, is biased in favor of the requesting node which is closest to the root. In order to allow more remote requesting nodes equal access to the bus, a fairness protocol is implemented when a requesting note sets its arbitration flag.

Node Overview

FIG. 2 is a simplified block diagram of a conventional 1394 node 200 comprising a transaction layer 202, a link layer 204, a physical layer 206 (more commonly referred to as a "PHY") and a serial bus manager 210. Briefly, the transaction layer 202 defines certain high level functions, such as how data is transferred between a node (e.g., a disk drive) and another node (e.g., a host computer) and how errors are handled. The link layer 204 communicates with the transaction layer 202 and provides addressing, data checking and data framing for packet transmission/reception. The PHY 206 translates signals from the link layer 204 into appropriate electrical signals for the 1394 bus, connected through ports 208, prevents more than one node from sending data by providing arbitration for the bus, and provides the physical interface between the node and the bus itself. The serial bus manager 210 provides functions to control nodes and manage bus resources; only one bus manager on the bus is active and exercises management functions for the entire bus.

FIG. 3 illustrates a typical arrangement of 1394-related components in a desktop computer 300 having an internal 1394 device, such as a hard disk drive 302, and external 1394 connector ports 304 for connection with a number of peripheral devices; a video-cable set-top box or notebook computer might have only a single external 1394 port. The computer 300 also includes a motherboard 306 with integrated link and transaction layers and a PHY chip 308 (while the link and transaction layers may be integrated into other chips, the PHY layer is generally implemented as a discrete chip). The PHY chip 308 is cable-connected both to the external 1394 ports 304 and to a PHY layer 310 in the disk drive 302 (which contains its own link and transaction layers and other requisite logic).

SUMMARY OF THE INVENTION

The present invention provides logic which enables multiple internal link layers, connected to corresponding 1394 devices, to communicate with each other without an intervening physical layer, thereby eliminating one or more PHY chips and associated PHY-PHY cables and connectors (reducing both cost and power consumption). Using a single, optional PHY chip or an integrated PHY block, the internal devices can also communicate with external 1394 devices.

In various embodiments, the logic of the present invention can also include, among other elements: multi-node logic to permit data to be transmitted between a device on an external 1394 bus and a selected one of two or more internal link layers; packet overlap logic to permit data to be transmitted between two internal link layers while data is being transmitted on an external 1394 bus; and a PHY-emulation module to provide each internal link layer with a corresponding "virtual" PHY layer having a node ID which is unique on an external 1394 bus.

The foregoing and other features and advantages of the invention will be apparent from the following more particular description of preferred embodiments of the invention, as illustrated in the accompanying drawings.

BRIEF DESCRIPTION OF THE DRAWINGS

FIG. 8A is a block diagram of the present invention with an integrated PHY layer and multiple link interfaces, all of which have access to the PHY; and FIG. 8B is a block diagram of the present invention with an integrated PHY layer and two link interfaces, only one of which has access to the PHY.

DETAILED DESCRIPTION OF THE INVENTION

Figure 4A:
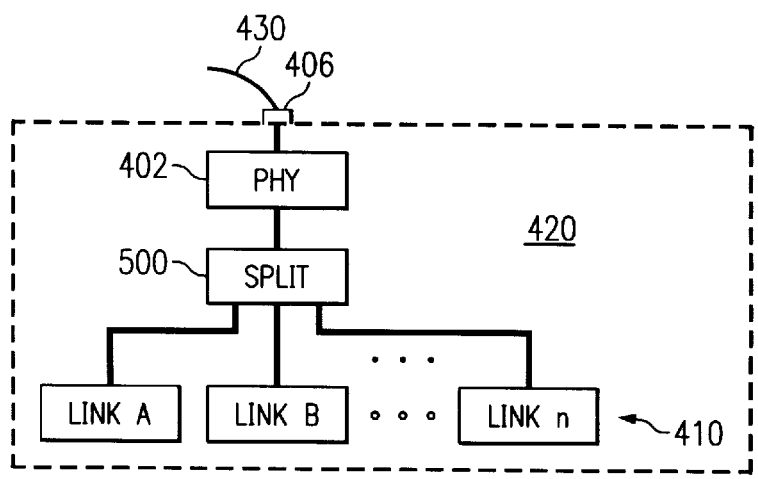
FIG. 4A is a high level block diagram of an interface tap of the present invention attached through a physical layer to an external 1394 bus.

FIG. 4A is a block diagram of the present invention 500 in an application in which 1394-enabled devices, connected to the module 500 through link layers 410, share a single physical layer 402 which is connectible to an external 1394 bus 430 through a port 406. The communications path within the module 500 among nodes attached to link layers 410 (and, optimally, to the external 1394 bus 430) is referred to herein as a "virtual 1394 bus". Data transmission between links on the virtual bus is logically the same as data transmission between links on the external 1394 bus 430 in that a link communication via the virtual bus sends/receives data packets and writes/reads registers in the same fashion as if the link was communicating on the actual (external) 1394 bus 430. Moreover, the present invention can accommodate multiple virtual buses, wherein links within a particular virtual bus communicate only with other links within the particular virtual bus.

Subject to an access restriction feature of the present invention described below, each device attached (through the 'n' link layers 410) to the module 500 can exchange data with each other such device as well as with devices attached to the external bus 430. Because the module 500 is inserted between the link layers 410 and a PHY layer 402, it can be referred to as a "separated PHY-link interface tap" or SPLIT™ module. In the FIGS. such as FIG. 4A and FIG. 6A, the SPLIT module is illustrated as intercepting all of the data lines between link layers and a PHY layer. However, some of the lines may instead be tapped whereby signals are shared among the PHY layer and the link layers.

Figure 4B:
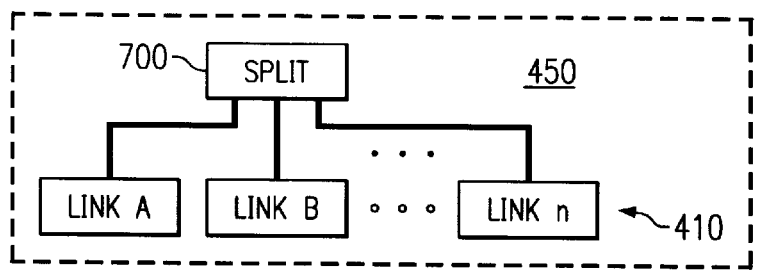
FIG. 4B is a high level block diagram of an interface tap the present invention in a stand-alone, PHY-less application.

FIG. 4B is a block diagram of another embodiment of the interface tap 700 of the present invention in an application without a physical layer (PHY) and without connection to an external 1394 bus, creating a stand-alone virtual 1394 bus 450. In the embodiment of FIG. 4B, 1394 devices connected to the interface tap 700 through the link layers 410 can exchange data with each other without a PHY.

Figure 5A:
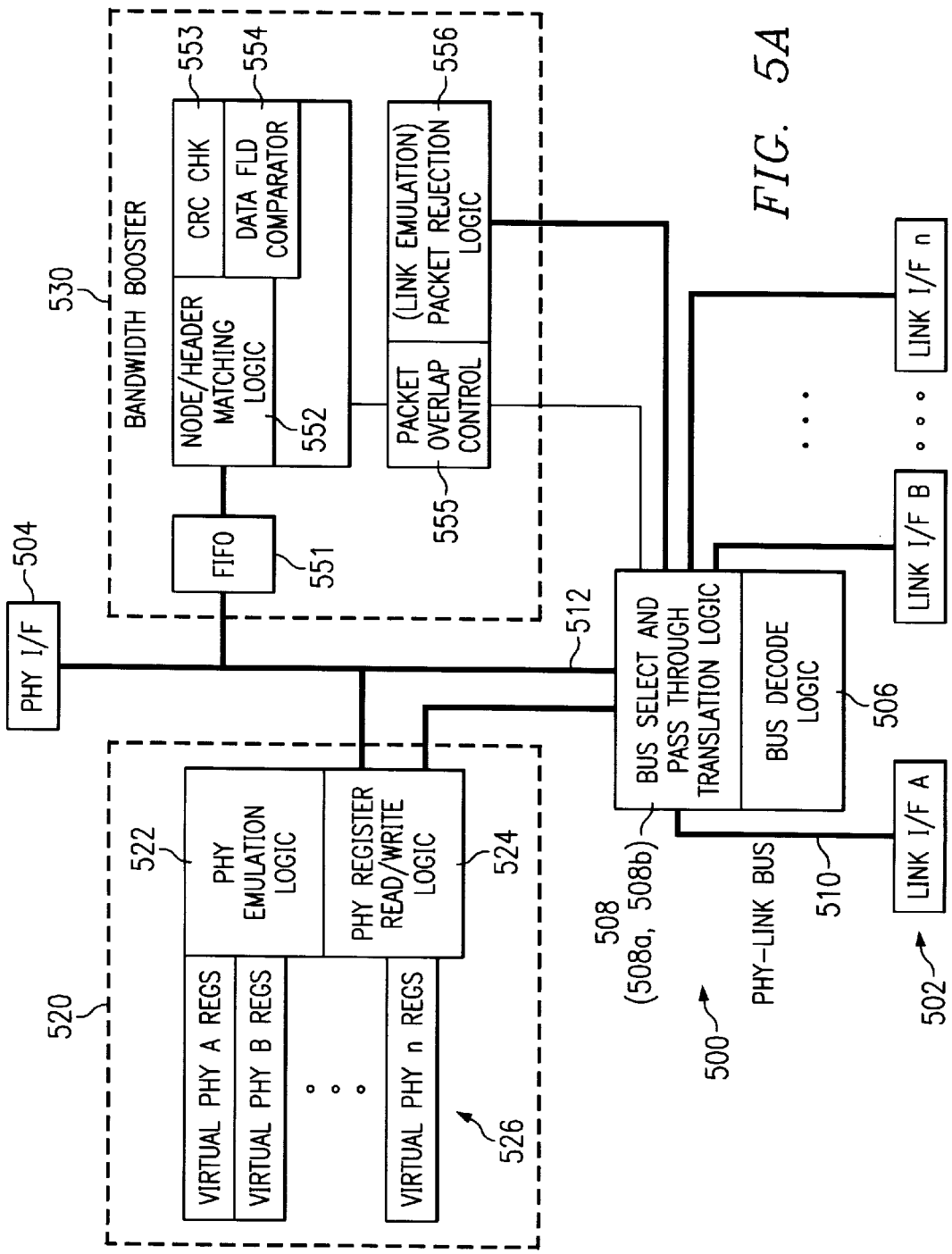
FIG. 5A is a block diagram of an interface tap with multiple link interfaces.

FIG. 5A is a more detailed block diagram of the embodiment of the interface tap 500 of FIG. 4A. The interface tap 500 includes a plurality of link interfaces 502, for interconnection with the 'n' link layers 410, and a PHY interface 504, for interconnection with the PHY layer 402. Also included in the interface tap 500 are PHY-link bus decode logic 506 and bus select 508a and pass-through translation logic 508b (collectively identified by reference numeral 508), a virtual PHY module 520 and a bandwidth booster module 530. A PHY-link bus 510 connects the link interfaces 502 with the bus select and pass-through logic 508 and a PHY-line 512 connects the bus select and pass through logic 508, the virtual PHY 520 and the bandwidth booster module 530 with the PHY interface 504. The virtual PHY 520 and bandwidth booster module 530 are also separately connected with the logic 508.

The virtual PHY module 520 includes PHY emulation logic 522, register read/write logic 524, and 'n' virtual PHY registers 526, each associated with one of the 'n' link interfaces 502. The bandwidth booster module 530 includes a FIFO buffer 551 connected to the PHY line 512, node/header matching logic 552, a CRC checker 553, a data field comparator 554, packet overlap control 555 and packet rejection (link emulation) logic 556.

The bus decode logic 506 is connected to the bus select and pass-through translation logic 508, determines the state of each link interface 502 and of the PHY interface 504 and provides the state information to the bus select logic 508a and packet rejection logic 556. In a first mode of operation, the bus select logic 508a acts as a switching device to connect selected link interfaces 502 to the external 1394 bus 430 through the PHY interface 504. In a second mode, the bus select logic 508a connects link interfaces 502 to each other within the virtual bus 420. And, in a third mode, the bus select logic 508a restricts the access of any of the link interfaces 502 to selected other of the link interfaces 502 and to the external bus 430.

The pass-through translation logic 508b translates signals sent by one of the link interfaces 502 into signals which appear to any device on the virtual bus 420 or on the external bus 430 as if the signals had, in fact, been transmitted over an actual 1394 bus. Advantageously, such translated signals incur less propagation delays when transmitted over the virtual bus 420 than if transmitted over the external 1394 bus 430.

Turning now to the virtual PHY module 520, the virtual PHY register associated with an active link interface (such as link interface A), through the PHY register read/write logic 524, continually shadows or maintains an updated copy of the contents of equivalent registers in the PHY 402 so that when a device connected to another internal link interface (such as link interface B) negotiates for the bus, the activity to/from link interface A can be interrupted, replaced by activity to/from link interface B, and then restored (by copying the contents of the virtual PHY register to the actual PHY register) upon completion of activity to/from link interface B. The PHY emulation logic 522 ensures that each link interface 502 appears to be connected to a separate, dedicated PHY.

The bandwidth booster module 530 increases the bandwidth of the interface tap 500 when the virtual bus 420, attached to the external 1394 bus 430. Within the module 530, the packet overlap control 555 increases the efficiency of the virtual 1394 bus 420 by permitting internal links 410 to send/receive data packets to/from each other (referred to as inter-link packet transfers) while other, non-conflicting activity is occurring on the external 1394 bus 430. The packet rejection 556 logic performs link emulation functions to prevent packet collisions. For example, when an incoming packet from the external 1394 bus 430 collides with an inter-link packet, the packet rejection logic 556 rejects the incoming packet and sends a signal to the bus select logic 508a and the PHY emulation logic 522 to block further non-overlapped, inter-link packet transmissions until the rejected external packet is retried in accordance with conventional 1394 protocol.

The FIFO buffer 551 stores incoming packet data to be used by the node/header matching logic 552 which (after verification of the header CRC by the CRC checker 553) compares incoming PHY packet headers with node ID numbers of those links on the virtual 1394 bus 420 which are unavailable. If the node/header matching logic 552 and packet overlap control 555 determine that an incoming packet is destined for an unavailable link, they send a signal to the packet rejection logic 556 which issues an appropriate response. If no such match is identified, the packet overlap control 555 enables inter-link data transfers. Finally, the data field comparator 554 compares the size of a data packet from the external bus 430 against a threshold value. If the threshold value is exceeded, the data field comparator 554 sends a signal to the packet overlap control 555 which, if so programmed, can signal the bus select logic 508a to enable inter-link data transfers while the external data packet is being transferred on the external bus. On the other hand, if the length of the external packet is less than the threshold value, there may be insufficient time to overlap an internal inter-link transfer.

The packet overlap function increases bandwidth by allowing concurrent transfers on virtual busses and external busses. For example, if one SPLIT module includes five attached links, La, Lb, Lc, Ld and Le, and one virtual bus connects Lb, Ld and the external bus, packets sent between attached Links Lb and Ld are transferred on the virtual bus (within the SPLIT logic) and not necessarily on the external bus. Packet overlap develops when this virtual bus traffic occurs at the same time as external bus traffic. That is, internal bus packet(s) are overlapped (in time) with the external bus packet(s). The overlap function can be configured in (but is not limited to) three modes: full-overlap, partial-overlap and non-overlap.

Mode 1: Full Overlap Mode

The full overlap mode enables internal packets to transfer concurrently with external bus packets and prevents packet collisions (a packet collision occurs when packets on the internal and external busses are targeted for the same link). Because links process packets one at a time (serially), two packets targeted for the same link at the same time would collide and one packet would be lost.

In the full overlap mode, the following logic: "Node/Hdr Matching Logic", "CRC Check", "Data Fld Comparator" and "Packet Overlap Control", decodes packets on the external bus and, if the external bus packet: (1) is not targeted for "virtual bus X" (where X is an arbitrary virtual bus also connected to the external bus) and (2) will occupy the external bus long enough to complete the internal bus packet transmission before completion of the external bus packet then "Packet Overlap Control" enables an internal bus packet(s) to transfer on "virtual bus X". The time a packet occupies the external bus is calculated by evaluating the following condition: (external$_{13}$ bus$_{13}$ packet_length/external$_{13}$ bus$_{13}$ packet_speed)>(max_internal$_{13}$ bus_packet_length/internal$_{13}$ bus$_{13}$ packet_speed+C), where C is a constant defined by design-specific overhead.

In the full overlap mode, if the external bus is idle and a link on the virtual bus needs to send a packet, then the SPLIT logic arbitrates for the external bus and occupies the external bus for as long as the internal packet transfer is ongoing. The external bus may be occupied with "garbage data" or with the actual packet contents depending on design considerations.

Mode 2: Partial Overlap Mode

In the partial overlap mode, an internal bus packet 'overlap' is enabled using the same conditions as full overlap mode, except the size/length of external packets are not compared. Thus, once a packet is identified as not being targeted towards a link on Virtual Bus X, internal packet transmission for Virtual Bus X is enabled. In the partial overlap mode, packet collisions can occur, especially if internal packets are substantially longer than external packets. When there is a collision in this mode, an external packet attempts to interrupt an ongoing internal packet. In this event, "packet rejection logic" rejects the external packet with a code asking the sender to retry/resend and the internal packet is allowed to complete. Once "packet rejection logic" rejects a packet, it disables packets on the associated virtual bus until the external packet has been retried. Halting the internal bus traffic essentially prioritizes external bus traffic over internal bus traffic. Various algorithms may be used to enable/disable internal bus traffic.

In the partial overlap mode, if the external bus is idle and a link on the virtual bus needs to send a packet, then SPLIT logic arbitrates for the external bus and occupies the external bus as long as the internal packet transfer is ongoing. The external bus can be occupied by garbage or with actual internal packet contents, depending on design considerations.

Mode 3: Non-Overlap Mode

In the non-overlap mode, virtual bus packets are generally enabled. Since internal packets cannot collide with ongoing external packets (because the links would never win arbitration) only the collision of external packets with ongoing internal packets are considered in this mode. When a packet collision is detected, the external packet is rejected with a message asking the sender to resend the packet, and attached links are held off until the packet is retried.

Note that various internal bus granting/prioritization algorithms may be used to optimize bus efficiency. The discussion of the three modes is provided for exemplary purposes only and is not intended to limit this invention solely to the use of those modes.

1394 bus operation when an interface tap 500 is present in one or more of the attached devices is similar to conventional 1394 bus operation and, as outlined in the Summary above, includes reset and initialization followed by normal arbitration and data transfers. Modifications in conventional operation which pertain to the interface tap 500 will be now be described, still with reference to the embodiment of FIGS. 4A and 5A.

Bus Reset and Initialization

A bus reset will occur when a node on the external 1394 bus 430 asserts a bus reset or when a link on the virtual (internal) bus 420 asserts a bus reset. When the bus reset is initiated by a node on the 1394 bus (such as the associated device being connected to the bus 430), the reset is indicated by status registers/interrupts in the PHY. The interface tap logic passes the registers/interrupts contents to each link 410 and updates the virtual PHY registers 526. When the bus reset is initiated by one of the link blocks 410, for example link A, registers/interrupts to the other links B through 'n' proceed normally; however the translation logic 508b simulates the register/interrupt conditions that would have occurred if an external node had generated the bus reset.

During tree identification, the 1394 bus determines the topology and establishes the root node. If the PHY 402 of the virtual bus 420 becomes the root node, a hard-wired switch (perhaps determined by a pull-up resistor) allocates root status to one of the attached link nodes 410. In a hard disk drive application, the selected link should be the host computer, not the hard disk, and such allocation is accomplished by setting an appropriate status bit in the PHY register file(s). For example, if the computer is attached to link A and the hard drive attached to link B and if the PHY 402 is designated as the root, then the interface tap 500 sets a root status bit in the virtual PHY A registers and clear the root status bit in the remaining virtual PHY registers.

During the self identification routine, each node in the network is assigned a node ID using a recursive algorithm. Conventionally (that is, without the interface tap 500), each PHY sends one set of self-identify packets to identify itself as a single node. In an application in which the interface tap 500 is present, the PHY 402 sends 'n' sets of self identify packets, where 'n' is the number of active links attached to the interface tap 500. Once self identification is complete, 1394 buses 420 and 430 are active and ready for data packet transfers.

Normal Packet Transfer

When one of the 'n' links 410 wants to arbitrate for the external bus 430, it asserts an LREQ signal to instruct the PHY 402 to arbitrate for the bus 430. If a second link tries to arbitrate after the first link has begun an arbitration request, then the translation logic 508b will reply to the second link with arbitration confirmation of "arbitration lost" indicating that arbitration is not currently possible.

Preferably, the fairness arbitration enable flag for each node should be maintained in the interface tap 500 and not in the PHY 402 in order for each link to be allowed a fair share of bus bandwidth.

Once a link has successfully arbitrated for the bus, it has control of the internal PHY-link bus 510 as well as the external 1394 bus 430. The link transmits its packet data onto the internal bus 510, through the PHY interface 504 to the PHY 402, which reads and encodes the data and transmits it onto the external 1394 bus 430. Additionally, the translation logic 508b translates the data packet issued by the link into a "received packet data format" which is sent to the other internal links. Consequently, if the sending link is attempting to communicate with another of the internal links 410, the translation logic 508b allows the target link to see the packet as if both the sending and target links were nodes on an actual 1394 bus 430. When one of the internal links 410 receives a packet from another link, the sending link arbitrates for the bus and transmits the packet onto the bus 510. Because the packet is addressed to an internal link, the translation logic 508b enables the receiving link to read the data. When a packet is issued onto the external bus 430, the packet includes the sending node address and the target node address. For each of the 'n' internal links 410 to access the external bus 430, the PHY 402 should be configured with multi-node logic to issue multiple ('n') self-ID packets and claim multiple ('n') node IDs. If a conventional, off-the-shelf PHY is employed (without any embedded SPLIT logic and without multi-node logic), one internal link can still send a packet to another internal link by setting the destination and source ID to the same value. This unique set of ID's will never occur during normal bus operation and therefore is uniquely identifiable by the internal nodes and SPLIT logic.

Higher level protocols

Higher level transaction processing protocols include packet-acknowledge codes. The interface tap 500 of the present invention only intervenes with this processing when two internal links communicate with each other. Because no PHY is involved in the process, the functions of the PHY must be simulated to satisfy link and transaction layers. Thus, when two internal links communicate, acknowledge codes are created in the corresponding virtual PHY register files. The two PHYs do not actually exist; however, the register files cause link and transaction layers to respond as if the additional PHYs actually do exist.

Figure 1:
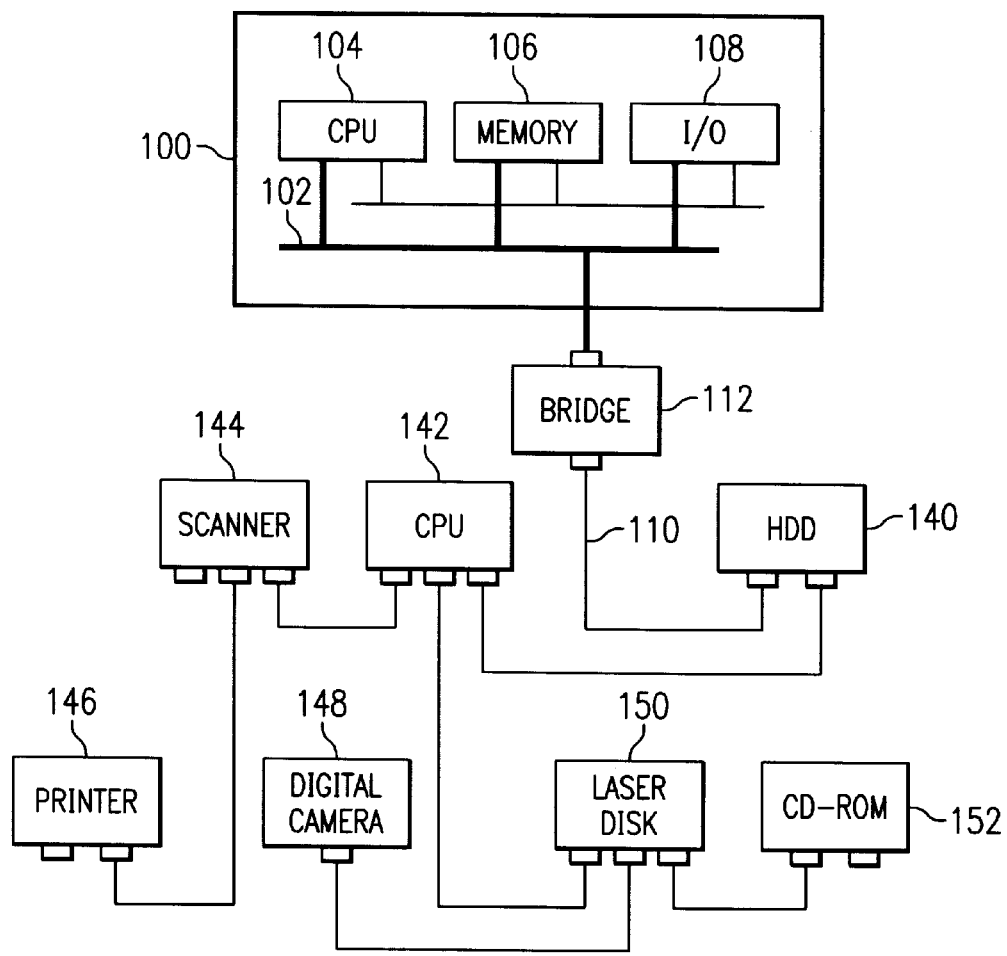
FIG. 1 illustrates an exemplary (prior art) 1394 bus topology.
Figure 2:
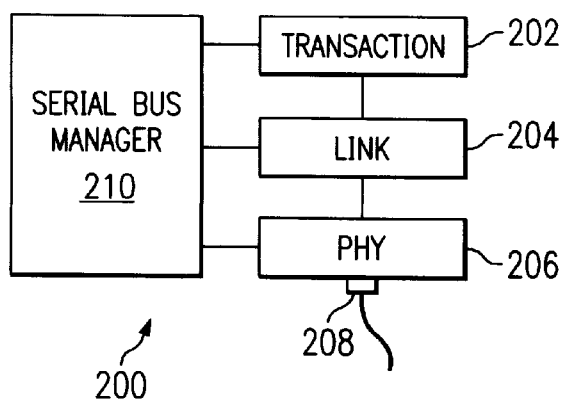
FIG. 2 is a block diagram of a prior art 1394 node.
Figure 3:
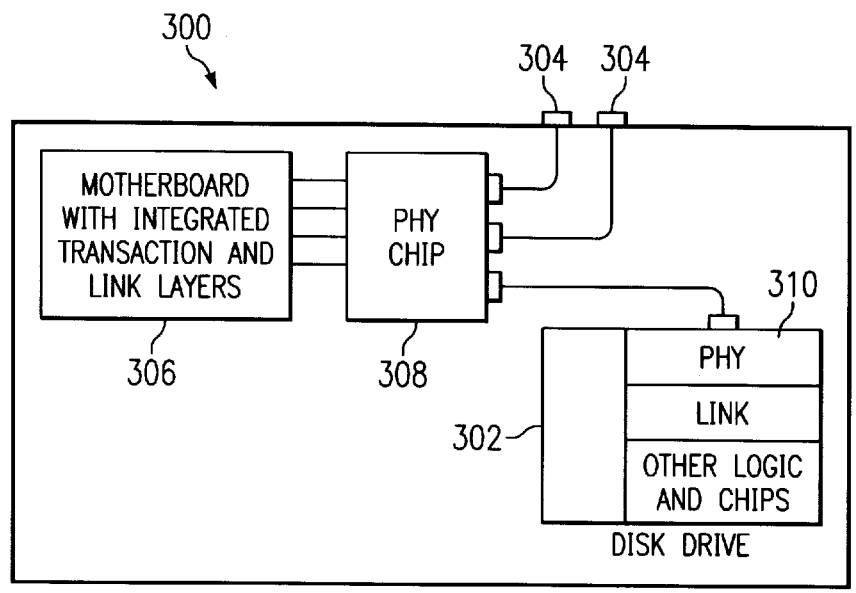
FIG. 3 is a block diagram of conventional 1394 components used in a prior art computer.
Figure 5B:
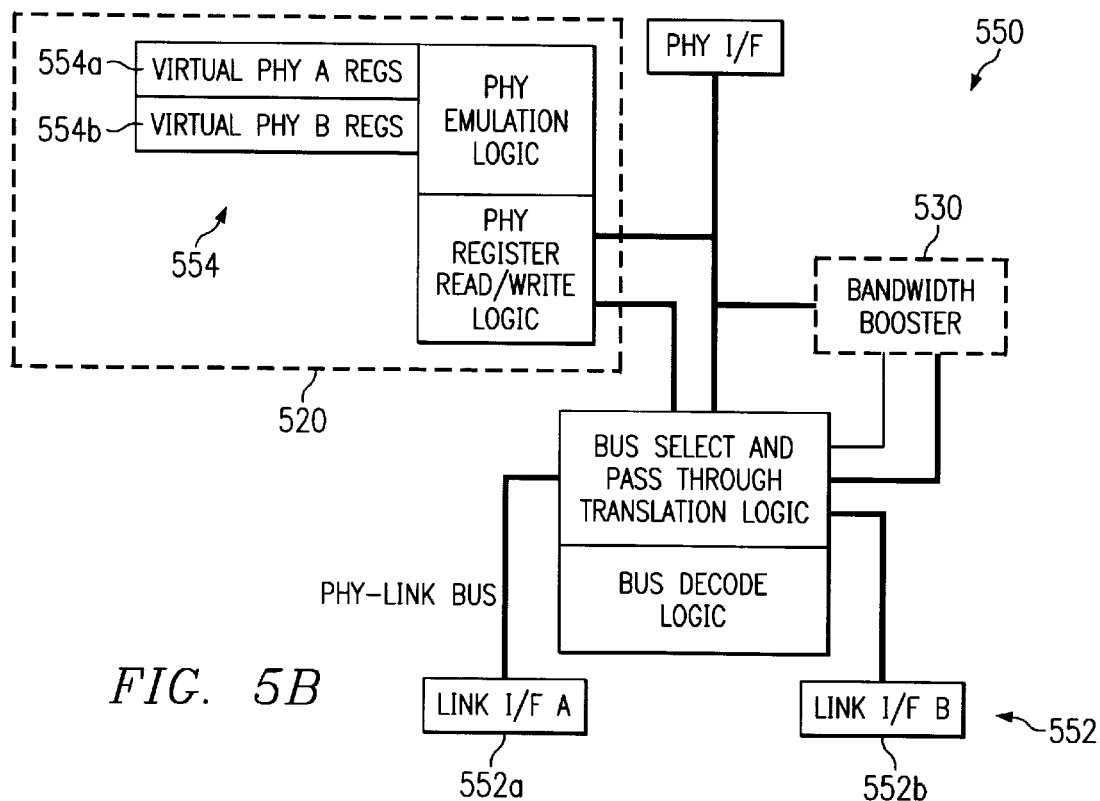
FIG. 5B is a block diagram of the an interface tap with two link interfaces.
Figure 6A:
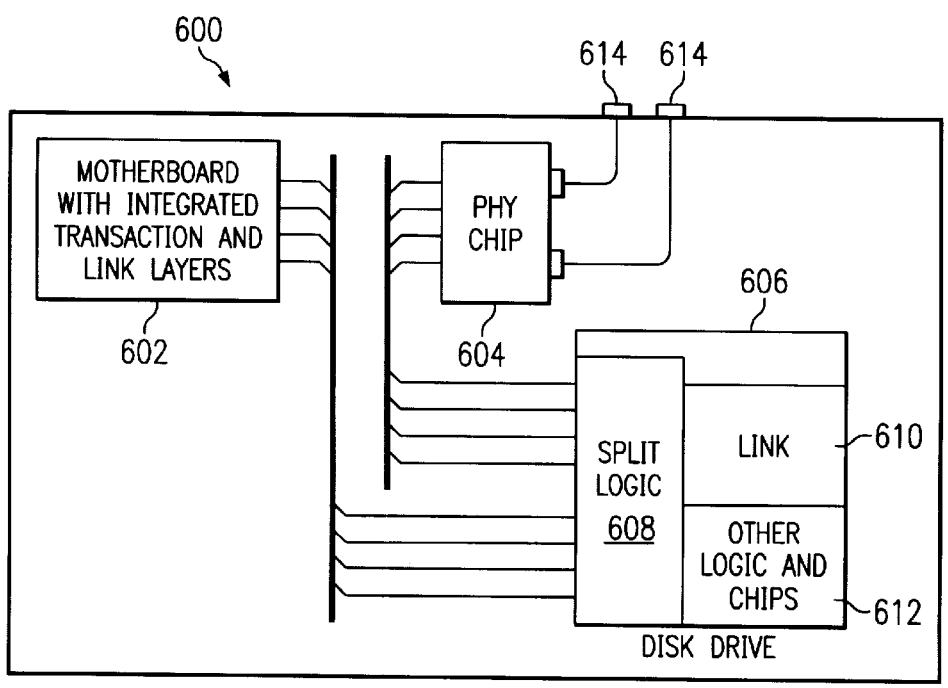
FIG. 6A is a block diagram of a desktop computer employing an embodiment of the interface tap of the present invention.
Figure 6B:
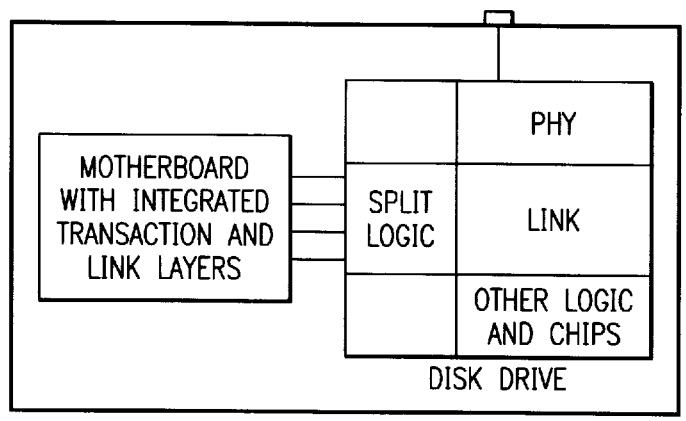
FIG. 6B is a block diagram of a video-cable set-top box employing another embodiment of the interface tap of the present invention.

Referring now to FIG. 5B, a block diagram is shown of a two-link embodiment of an interface 20 tap 550 with two link interfaces 552a and 552b and two virtual PHY registers 554a and 554b. Such an embodiment may be integrated more often than the multi-link embodiment 500 of FIG. 5A in applications such as small computers which incorporate a single, internal 1394 -enabled device, such as a hard disk drive. An example of an application employing the embodiment of FIG. 5B is illustrated in FIG. 6A. A computer 600 includes a motherboard 602 with an integrated link layer, a PHY chip 604 and an internal disk drive 606. The PHY chip 604 is a conventional PHY chip. However, in contrast to the computer 300 of FIG. 3 with two dedicated PHY layers (PHY chip 308 and PHY layer 310), the disk drive 606 includes the interface tap 500 as well as a link layer 610 and other logic 612. Signal lines are routed between the motherboard 602 and the interface tap 608 and between the interface tap 608 and the PHY chip 604. As in the conventional architecture of FIG. 3, the PHY chip 604 includes multiple ports 614 for connection with an external 1394 bus. It will be appreciated that employing the interface tap 608 in the system 600 allows a system designer to eliminate one PHY, two connectors and an internal cable from the design without having to modify other system components. Consequently, significant savings in both cost and power can be realized. When multiple devices are connected to the virtual 1394 bus 420 (FIG. 5A), still further savings can be achieved from the elimination of additional PHY layers and associated cables and connectors.

PHY-Less Implementation

Figure 7:
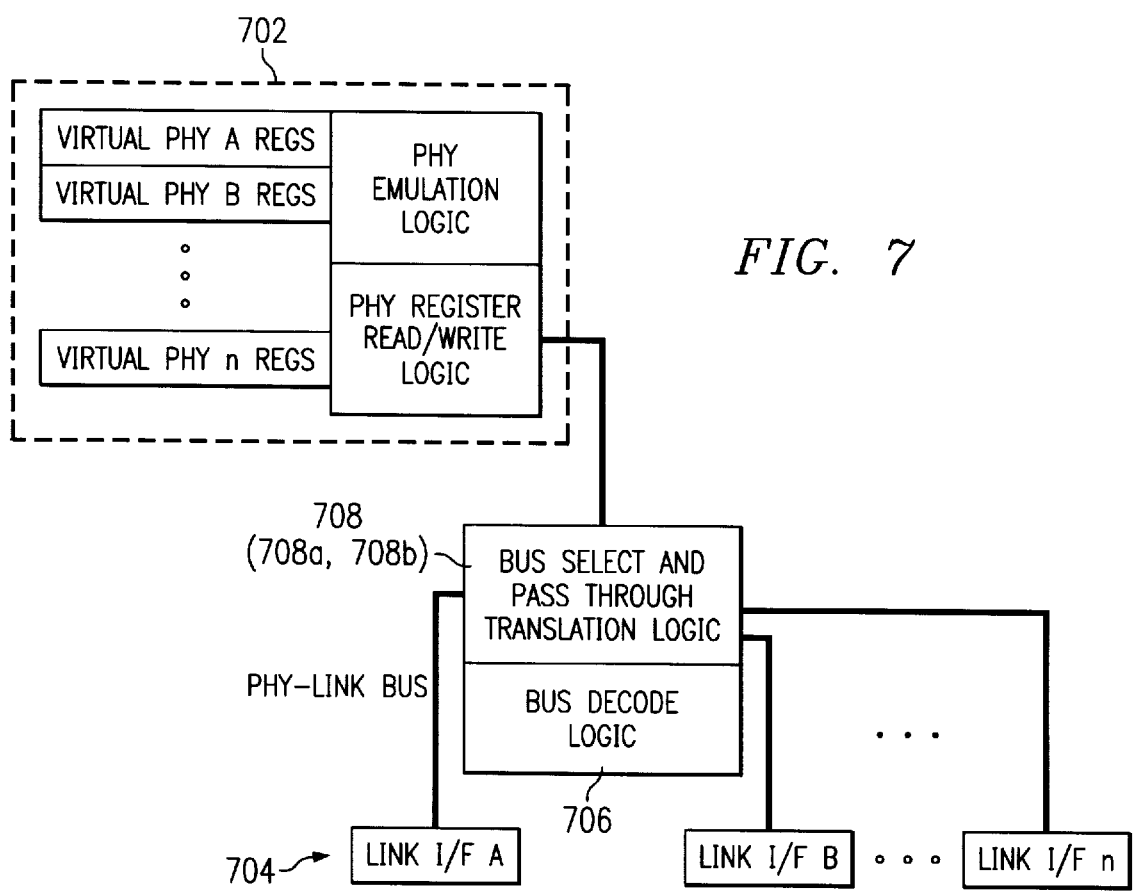
FIG. 7 is a block diagram of a PHY-less implementation of the interface tap of the present invention.

In addition to the PHY-sharing function described above, the interface tap of the present invention can provide inter-link communication, even without an actual PHY layer. FIG. 7 is a block diagram of a PHY-less interface tap 700 including 'n' link layers 704, a virtual PHY 702 (with 'n' virtual register sets), bus decode logic 706, bus select logic 708a and pass-through translation logic 708b. Because the resulting virtual 1394 bus 450 (see FIG. 4B) is not attached to an external 1394 bus, no bandwidth booster module is necessary. In operation, the pass-through translation logic 708b translates signals from a source link into signals recognizable by a destination link as if the signals had passed through an actual PHY.

Access Restriction

Still another feature of the present invention is the ability of the interface tap to restrict the access of one or more links on the virtual bus to the external 1394 bus or to each other. In the absence of an external bus, communication can be enabled and disabled between designated links, thereby creating multiple virtual buses. For example, in a four link environment, the logic can be configured for links A and C to share a virtual bus and communicate only with each other and for links B and D to share another virtual bus and communicate only with each other. The logic may also be configured to allow a link to access more than one virtual bus.

When the interface tap is attached to an external 1394 bus, internal links can be granted/denied access to each other and to the external bus but in a more limited manner than in the absence of a connection to an external 1394 bus. A virtual bus may contain links that are allowed to communicate with the external bus ($L_{13}$ EXT) and links that are not allowed to communicate with the external bus (L_INT). Moreover, each $L_{13}$ INT link may also be restricted from communicating with any but one designated $L_{13}$ EXT link. Therefore, the number of $L_{13}$ EXT links should be greater than or equal to the number of $L_{13}$ INT links that are reserved in this manner. Additionally, a link may be configured so that one physical L_EXT link functions as multiple logical L_EXT links, allowing multiple physical L_INT links to communicate with the one physical $L_{13}$ EXT link.

During bus initialization, each device on the bus, including each device attached to an $L_{13}$ EXT link, is assigned a bus-unique node ID which is used to identify the source and destination of packets being transmitted from one device to another. When a device recognizes that it is the destination of a packet on the bus, the device reads and processes that packet and transmits an acknowledge-receipt back to the source. However, there are a finite number of available ID numbers and all may have been assigned, leaving no unique IDs available to devices attached to $L_{13}$ INT links. The present invention overcomes the resulting limitation by assigning to an $L_{13}$ INT link the same node ID which was assigned to the L_EXT link. Packet communication between an $L_{13}$ INT device and an $L_{13}$ EXT device having the same node ID is accomplished by the source link creating a packet in which the source ID is the same as the destination ID, namely, the node ID of the $L_{13}$ EXT link. Because the 1394 protocol prohibits closed loops in the bus, a node is not able to detect a packet which it originated, even if the destination ID is also the ID of the source node. The foregoing special nature of ID matching restricts only one logical L_INT link to each logical L_EXT link. It will be appreciated that if one physical $L_{13}$ EXT link claims multiple node IDs and emulates the function of multiple logical $L_{13}$ EXT links, then two physical $L_{13}$ INT links can communicate with the physical $L_{13}$ EXT link.

As an example of the usefulness of access restrictions, in a computer with an internal hard disk, where both the computer and the drive are 1394 enabled (as in FIG. 6A), it can be very advantageous for the computer to have sole access to the internal drive and not allow any other node to access the drive.

FIGS. 8A and 8B are embodiments of the present invention in which a PHY layer is integrated within the interface tap. FIG. 8A is a block diagram of such a configuration with 'n' link interfaces 802. The PHY block 804 includes logic blocks common to PHY layers, including status/control registers 806. Additionally, if all 'n' links are to have access to an external bus, 'n' virtual PHY registers 808 are implemented in the PHY block 804. Multiple node logic 810 is also included to permit the assignment of unique node IDs to each link even though access by each of the links is through the single PHY block 804. It will be understood that in many applications (such as that shown in FIG. 5B), 'n' will equal 2.

If only one link is to have access to the external bus, as illustrated in FIG. 8B, the PHY block 854 need not include multiple-node logic and may include only one virtual PHY register 856. The remaining link is restricted from accessing the external bus.

While the invention has been particularly shown and described with reference to preferred embodiments thereof, it will be understood by those skilled in the art that various changes in form and details may be made therein without departing from the spirit and scope of the invention as set forth in the appended claims.

What is claimed is:

1. A logic module for a subsystem compatible with the IEEE 1394–1995 standard, comprising:
    a plurality of link interfaces for interconnection with a corresponding plurality of link layers;
    link select logic coupled to each of said plurality of link interfaces through a PHY-link bus to permit transmission of data between a PHY layer and a selected one of the link layers; and
    a packet translator interconnected to the PHY-link bus and to said link interfaces to permit transmission of data between a first of the link layers and a second of the link layers.

2. The logic module of claim 1, further comprising an integrated PHY layer coupled to said link select logic through a PHY line, said PHY layer connectable to an external 1394 bus.

3. The logic module of claim 2, wherein data may be transmitted between said the external 1394 bus and at least a predetermined one of the plurality of link layers through said integrated PHY layer.

4. The logic module of claim 2, said integrated PHY layer comprising multi-node logic to permit said integrated PHY layer to claim multiple node IDs wherein data may be transmitted between the external 1394 bus and at least a selected one of at least two of the plurality of link layers.

5. The logic module of claim 2, further comprising packet overlap logic coupled to said PHY line to permit local data to be transmitted between the first and second link layers while other data is present on the external 1394 bus.

6. The logic module of claim 5, further comprising packet rejection logic coupled to said PHY line to prevent the other data on the external 1394 bus from reaching said link select logic while the local data is being transmitted between the first and second link layers.

7. The logic module of claim 2, further comprising a PHY-emulation module to provide each of the plurality of link layers with a corresponding virtual PHY layer having a node ID which is unique to the external 1394 bus.

8. The logic module of claim 7, said PHY-emulation module comprising:
    a set of virtual PHY registers associated with each of said plurality of link interfaces; and
    PHY emulation logic for:
        storing in a first set of virtual PHY registers an updated copy of contents of PHY registers in said integrated PHY layer during transmission of data between an associated first link interface and said integrated PHY layer;
        maintaining the contents of said first set of virtual PHY registers during transmission of data between a second link interface and said integrated PHY layer; and
        restoring the contents of said first set of virtual PHY registers into the PHY registers when transmission of data resumes between said associated first link interface and said integrated PHY layer.

9. The logic module of claim 7, wherein said PHY-emulation module resides in the integrated PHY layer.

10. The logic module of claim 7, wherein said PHY-emulation module is interconnected to said PHY line.

11. The logic module of claim 1, further comprising a PHY interface coupled to said link select logic through a PHY line, said PHY interface connectable to an external PHY layer.

12. The logic module of claim 11, further comprising a PHY-emulation module to provide each of the said plurality of link layers with a corresponding virtual PHY layer having a node ID which is unique to an external 1394 bus.

13. The logic module of claim 12, further comprising packet overlap logic coupled to said PHY line to permit local data to b e transmitted between the first and second link layers while other data is present on the external 1394 bus.

14. The logic module of claim 13, further comprising packet rejection logic coupled to said PHY line to prevent the other data on the external 1394 bus from reaching the first and second link layers while the local data is being transmitted between the first and second link layers.

15. The logic module of claim 1, further comprising a PHY-emulation module to provide each of the plurality of link layers with a corresponding virtual PHY layer having a node ID which is unique to an external 1394 bus.

16. The logic module of claim 15, further comprising an integrated PHY layer coupled to said link select logic through a PHY line, said PHY layer connectable to the external 1394 bus.

17. The logic module of claim 16, wherein said PHY-emulation module resides in the integrated PHY layer.

18. The logic module of claim 16, further comprising:
packet overlap logic coupled to said PHY line to permit local data to be transmitted between the first and second link layers while other data is present on the external 1394 bus; and
packet rejection logic coupled to said PHY line to prevent the other data on the external 1394 bus from reaching the first and second link layers while the local data is being transmitted between the first and second link layers.

19. The logic module of claim 15, further comprising:
packet overlap logic coupled to said PHY line to permit local data to be transmitted between the first and second link layers while other data is present on the external 1394 bus; and
packet rejection logic coupled to said PHY line to prevent the other data on the external 1394 bus from reaching the first and second link layers while the local data is being transmitted between the first and second link layers.

20. A logic module for a subsystem compatible with the IEEE 1394–1995 standard, comprising:
a plurality of link interfaces for interconnection with a like plurality of link layers;
a plurality of virtual PHY layers, each associated with one of said plurality of link interfaces and having logic which can claim a unique node ID;
link select logic coupled to each of said plurality of link interfaces through a PHY-link bus to permit transmission of data to and from a selected one of the link layers through an interconnected link interface and the associated virtual PHY layer; and
a packet translator interconnected to the PHY-link bus and to said link interfaces to permit transmission of data between a first one of the plurality of link layers and a second one of the plurality of link layers through associated first and second virtual PHY layers.

21. The logic module of claim 20, wherein said plurality of virtual PHY layers comprises:
a plurality of sets of shadow registers, each set associated with one of said plurality of link interfaces; and
PHY emulation logic for:
storing in a first set of virtual PHY registers an updated copy of contents of PHY registers during transmission of data between an first associated link layer and a second link layer;
maintaining the contents of said first set of virtual PHY registers during transmission of data between two link layers;
restoring the contents of said first set of virtual PHY registers into the PHY registers when transmission of data resumes between said first associated first link layer and the second link layer;
modifying shadow registers to emulate PHY behavior when link-PHY access does not require data transfer on an external 1394 bus; and
emulating PHY behavior during PHY-link communication when the communication does not require data transfer on the 1394 bus.

22. The logic module of claim 20, further comprising:
a PHY interface coupled to said link select logic through a PHY line, said PHY interface connectable to an external 1394 bus;
packet overlap logic coupled to said PHY line to permit local data to be transmitted between the first and second link layers while other data is present on the external 1394 bus; and
packet rejection logic coupled to said PHY line to prevent the other data on the external 1394 bus from reaching the first and second link layers while the local data is being transmitted between the first and second link layers.

23. The logic module of claim 20, further comprising an integrated PHY layer coupled to said link select logic through a PHY line, said integrated PHY layer connectable to an external 1394 bus.

24. The logic module of claim 23, said integrated PHY layer comprising multi-node logic to permit said integrated PHY layer to claim multiple node IDs wherein data may be transmitted between said integrated PHY layer and at least two of the plurality of link layers.

25. A logic module for a subsystem compatible with the IEEE 1394–1995 standard, comprising:
a plurality of link interfaces for interconnection with a like plurality of link layers;
a plurality of virtual PHY layers, each associated with one of said plurality of link interfaces and having a unique node ID;
link select logic coupled to each of said plurality of link interfaces through a PHY-link bus to permit transmission of data to and from a selected one of the link layers through an interconnected link interface and the associated virtual PHY layer;
a packet translator interconnected to the PHY-link bus and to said link interfaces to permit transmission of data between a first one of the plurality of link layers and a second one of the plurality of link layers through associated first and second virtual PHY layers;
a PHY interface coupled to said link select logic through a PHY line, said PHY interface connectable to an external 1394 bus through a PHY layer;
packet overlap logic coupled to said PHY line to permit local data to be transmitted between the first and second link layers while other data is present on the external 1394 bus;
packet rejection logic coupled to said PHY line to prevent the other data on the external 1394 bus from reaching the first and second link layers while the local data is being transmitted between the first and second link layer.

26. The logic module of claim 25, wherein said plurality of virtual PHY layers comprises:

a plurality of sets of virtual PHY registers, each associated with one of said plurality of link interfaces; and PHY emulation logic for:

storing in a first set of virtual PHY registers an updated copy of contents of PHY registers in said integrated PHY layer during transmission of data between an associated first link interface and the external 1394 bus;

maintaining the contents of said first set of virtual PHY registers during transmission of data between a second link interface and said external 1394 bus; and restoring the contents of said first set of virtual PHY registers into the PHY registers when transmission of data resumes between said associated first link interface and the external 1394 bus.

27. The logic module of claim 25, further comprising an integrated PHY layer coupled to said PHY interface, wherein said integrated PHY layer is connectable to the external 1394 bus.

28. The logic module claim 27, said integrated PHY layer comprising multi-node logic to permit said integrated PHY layer to claim multiple node IDs wherein data may be transmitted between said integrated PHY layer and at least two of the plurality of link layers.

29. A logic module for a subsystem compatible with the IEEE 1394–1995 standard, comprising:

a plurality of link interfaces for interconnection with a like plurality of link layers;

an integrated PHY layer coupled to said PHY interface, wherein said integrated PHY layer is connectable to an external 1394 bus, said integrated PHY layer comprising multinode logic to permit said integrated PHY layer to claim multiple node IDs wherein data may be transmitted between said integrated PHY layer and at least two of the plurality of link interfaces;

a plurality of virtual PHY layers, each being associated with one of said plurality of link interfaces and having a unique node ID;

link select logic coupled to each of said plurality of link interfaces through a PHY-link bus to permit transmission of data to and from a selected one of the link layers through an interconnected link interface and the associated virtual PHY layer;

a packet translator interconnected to the PHY-link bus and to said link interfaces to permit transmission of data between a first one of the plurality of link layers and a second one of the plurality of link layers through associated first and second virtual PHY layers; and a PHY interface coupled to said link select logic through a PHY line, said PHY interface connectable to the external 1394 bus through a PHY layer.

30. The logic module of claim 29, further comprising:

packet overlap logic coupled to said PHY line to permit local data to be transmitted between the first and second link layers while other data is present on the external 1394 bus; and packet rejection logic coupled to said PHY line to prevent the other data on the external 1394 bus from reaching first and second link layers while the local data is being transmitted between the first and second link layers.

31. The logic module of claim 29, wherein said plurality of virtual PHY layers comprises:

a plurality of sets of virtual PHY registers, each set associated with one of said plurality of link interfaces; and PHY emulation logic for:

storing in a first set of virtual PHY registers an updated copy of contents of PHY registers in said integrated PHY layer during transmission of data between an associated first link interface and the external 1394 bus;

maintaining the contents of said first set of virtual PHY registers during transmission of data between a second link interface and said external 1394 bus; and restoring the contents of said first set of virtual PHY registers into the PHY registers when transmission of data resumes between said associated first link interface and the external 1394 bus.

\* \* \* \* \*